(12) United States Patent
Bos et al.

(10) Patent No.: US 11,416,259 B2
(45) Date of Patent: Aug. 16, 2022

(54) LOOK-AHEAD STAGING FOR TIME-TRAVEL RECONSTRUCTION

(71) Applicant: SAP SE, Walldorf (DE)

(72) Inventors: Daniel Bos, Beijing (CN); Dan Liu, Bruchsal (DE); Tobias Karpstein, Eschelbronn (DE)

(73) Assignee: SAP SE, Walldorf (DE)

( * ) Notice: Subject to any disclaimer, the term of this patent is extended or adjusted under 35 U.S.C. 154(b) by 8 days.

(21) Appl. No.: 17/118,788

(22) Filed: Dec. 11, 2020

(65) Prior Publication Data

US 2022/0188122 A1 Jun. 16, 2022

(51) Int. Cl.
*G06F 9/30* (2018.01)
*G06F 9/38* (2018.01)
*G06F 9/54* (2006.01)
*G06F 8/71* (2018.01)

(52) U.S. Cl.
CPC .............. *G06F 9/3869* (2013.01); *G06F 8/71* (2013.01); *G06F 9/3812* (2013.01); *G06F 9/547* (2013.01)

(58) Field of Classification Search
CPC ....... G06F 9/3812; G06F 9/3869; G06F 9/547
See application file for complete search history.

(56) References Cited

U.S. PATENT DOCUMENTS

| 6,889,231 B1 | 5/2005 | Souder et al. |
| 2005/0021567 A1 | 1/2005 | Holenstein et al. |
| 2005/0235075 A1 | 10/2005 | Dijkhof et al. |
| 2006/0004882 A1 | 1/2006 | Itikarlapalli et al. |
| 2007/0124347 A1* | 5/2007 | Vivian ................. G06F 11/2028 |
| 2015/0032710 A1 | 1/2015 | Latrous et al. |
| 2015/0347551 A1* | 12/2015 | Shang ..................... G06F 16/273 707/615 |
| 2016/0275089 A1 | 9/2016 | Soundararajan et al. |
| 2016/0291980 A1* | 10/2016 | Ge ......................... G06F 9/3871 |

(Continued)

FOREIGN PATENT DOCUMENTS

| EP | 3217301 A1 | 9/2017 | |
| WO | WO-2016119546 A1 * | 8/2016 | ............... G06F 1/20 |

OTHER PUBLICATIONS

Bos et al., U.S. Appl. No. 17/118.770, filed Dec. 11, 2020, entitled "Look-Ahead Staging for Accelerated Data Extraction".

(Continued)

*Primary Examiner* — Corey S Faherty
(74) *Attorney, Agent, or Firm* — Sterne, Kessler, Goldstein & Fox P.L.L.C.

(57) ABSTRACT

Disclosed herein are system, method, and computer program product embodiments for utilizing look-ahead-staging (LAS) to guarantee the ability to rollback and reconstruct a package while minimizing locking duration and enabling multiple packages to be processed in a data pipeline simultaneously. An embodiment operates by receiving a package from a source system for processing through a data pipeline. The embodiment stores the package in a persistent storage together with a respective package status. The embodiment transmits the package to the data pipeline in response to the storing. The embodiment receives a commit notification for the package from a target system in response to the transmitting. The embodiment then removes the package from the persistent storage in response to receiving the commit notification for the package.

20 Claims, 4 Drawing Sheets

(56) References Cited

U.S. PATENT DOCUMENTS

| | | | |
|---|---|---|---|
| 2017/0177617 A1* | 6/2017 | Johnson | G06F 11/1474 |
| 2017/0185493 A1* | 6/2017 | Graefe | G06F 11/1471 |
| 2019/0361913 A1 | 11/2019 | Yoon et al. | |
| 2020/0310798 A1* | 10/2020 | Shevgoor | G06F 9/3842 |
| 2020/0320059 A1* | 10/2020 | Kumar | G06F 16/2358 |
| 2021/0034476 A1 | 2/2021 | Mathur | |

OTHER PUBLICATIONS

Extended Search Report for European Patent Application No. 21195925.9, dated Feb. 18, 2022, 7 pages.

\* cited by examiner

| Subscription Identifier 202 | Package Identifier 204 | Status 206 | Data 208 |
|---|---|---|---|
| Subscription 0 | Package 0-0 | Committed | Data 0-0 |
| Subscription 0 | Package 0-1 | In progress | Data 0-1 |
| Subscription 0 | Package 0-2 | New | Data 0-2 |
| Subscription 0 | Package 0-3 | Rolled back | Data 0-1 |
| Subscription 0 | Package 0-4 | Rolled back | Data 0-2 |
| ... | ... | ... | ... |

LOOK-AHEAD STAGING FOR TIME-TRAVEL RECONSTRUCTION

BACKGROUND

A package (also referred to as a transaction) is often used to transfer data from a source system to a target system. A package can represent a set of changes that are either applied in full in the target system or are not applied at all. When a problem occurs anywhere between the source and target systems, the source system can rollback the uncommitted package and try reconstructing it in the target system.

However, rolling back and reconstructing the uncommitted package is often not possible when the source system attempts to asynchronously commit the package in the target system. This is because the source system may be continuously updated after attempting to commit the package, and thus the data in the source system persistent storage may have changed in the meantime. Some systems can guarantee the ability to rollback and reconstruct a package by making sure a region of the persistent storage of the source system and a region of the persistent storage of the target system are locked during the processing of the package. However, the duration of the locking can be very long which can impede other users from using the persistent storages of the source and target systems. This often occurs when processing the package using a data pipeline having many intermediate processing stages or crossing many different system boundaries. Moreover, this locking can prevent the data pipeline from processing more than one package at a given point in time which can decrease the throughput of the data pipeline.

BRIEF DESCRIPTION OF THE DRAWINGS

The accompanying drawings are incorporated herein and form a part of the specification.

FIG. 2 is an example of an ordered list of packages maintained by a LAS module, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for utilizing look-ahead-staging (LAS) to guarantee the ability to rollback and reconstruct a package while minimizing locking duration and enabling multiple packages to be processed in a data pipeline simultaneously.

An embodiment operates by receiving a package from a source system for processing through a data pipeline. The embodiment stores the package in a persistent storage together with a respective package status. The embodiment transmits the package to the data pipeline in response to the storing. The embodiment receives a commit notification for the package from a target system in response to the transmitting. The embodiment then removes the package from the persistent storage in response to receiving the commit notification for the package.

The embodiment can solve at least two technological problems when processing a package through the data pipeline between the source system and the target system. First, the embodiment can minimize the duration of locking of the persistent storages of the source and target systems while maintaining the ability to rollback and reconstruct an uncommitted package in response to a problem occurring anywhere between the source and target systems. Second, the embodiment can allow each processing step of the data pipeline to work on a different package simultaneously which can increase the throughput of the data pipeline.

Figure 1:
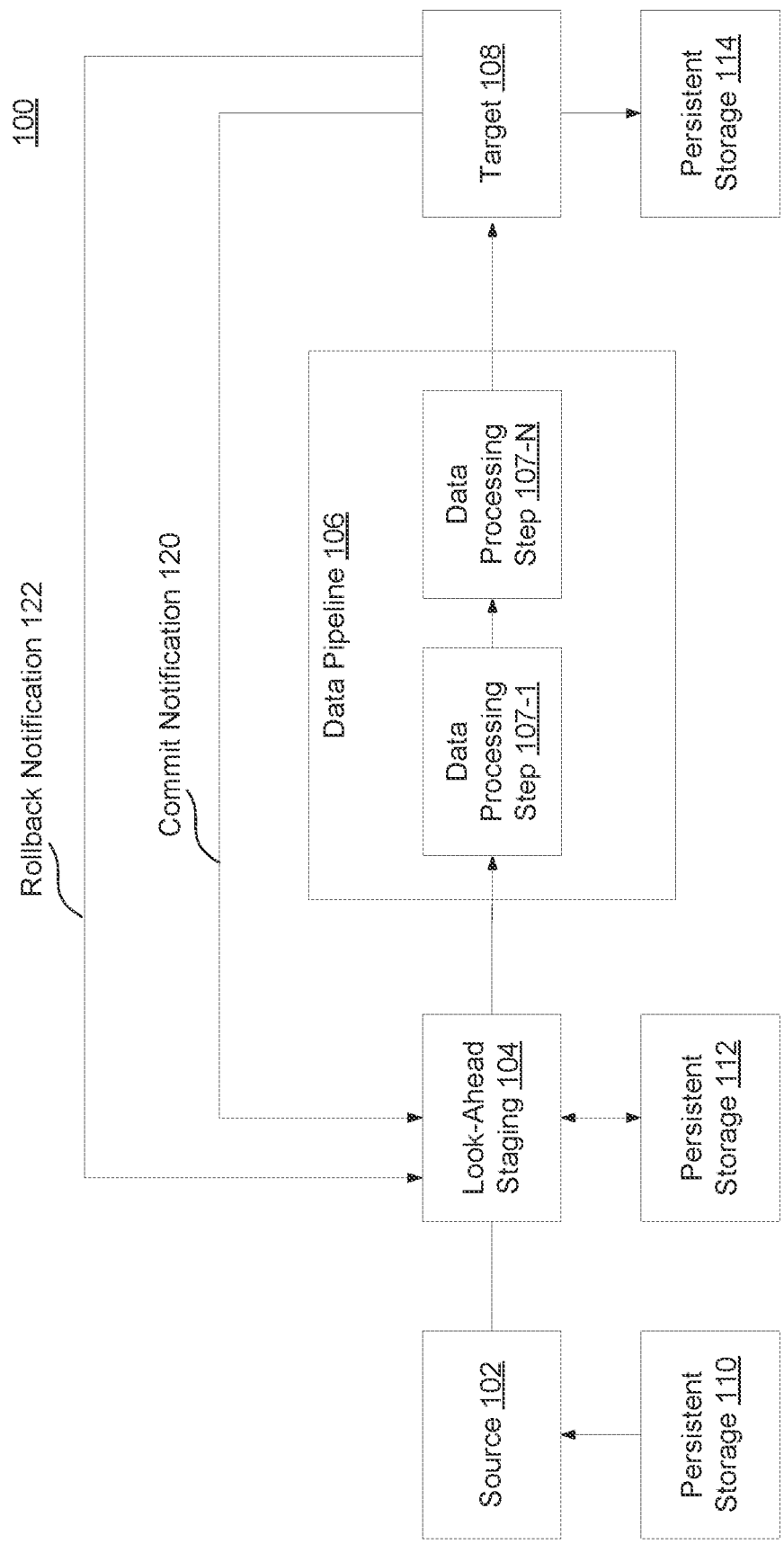
FIG. 1 is a block diagram of a system that utilizes look-ahead staging (LAS) to guarantee the ability to rollback and reconstruct a package while minimizing locking duration and enabling multiple packages to be processed in a data pipeline simultaneously, according to some embodiments.

FIG. 1 is a block diagram of a system 100 that utilizes LAS to guarantee the ability to rollback and reconstruct a package while minimizing locking duration and enabling multiple packages to be processed in a data pipeline simultaneously, according to some embodiments. System 100 can include source system 102, LAS 104, data pipeline 106, and target system 108. As would be appreciated by a person of ordinary skill in the art, system 100 can include multiple target systems 108.

Source system 102 can be a desktop computer, server, virtual machine, container, laptop, tablet, smartphone, or other device as would be appreciated by a person of ordinary skill in the art. Source system 102 can also be a software platform for cloud computing.

Source system 102 can include producer software that reads a package (also referred to as a transaction) from persistent storage 110. A package can represent a set of changes that are either applied in full in target system 108 (also referred to as committed) or are not applied at all. When a problem occurs with applying the package in target system 108, source system 102 can rollback the uncommitted package and try reconstructing it in target system 108.

Persistent storage 110 can represent any storage device that retains data after power to the storage device is shut off. For example, persistent storage 110 can be a hard disk drive, solid-state drive, database, filesystem, object-store, or various other types of storage device as would be appreciated by a person of ordinary skill in the art. Persistent storage 110 can be communicatively coupled to source system 102.

Source system 102 can transmit the package to LAS 104, and LAS 104 can transmit the package through data pipeline 106 to target system 108. In some embodiment, source system 102 can transmit the package to LAS 104, and LAS 104 can transmit the package through data pipeline 106 to multiple target systems 108. In other words, LAS 104 can introduce a break in the package processing chain. LAS 104 can be a software module that is communicatively coupled to source system 102. LAS 104 can also be a hardware module, device, or system that is communicatively coupled to source system 102.

LAS 104 can write the package to persistent storage 112. Persistent storage 112 can represent any storage device that retains data after power to that device is shut off. Persistent storage 112 can be communicatively coupled to LAS 104.

Target system 108 can be a desktop computer, server, virtual machine, container, laptop, tablet, smartphone, or other device as would be appreciated by a person of ordinary skill in the art. Target system 108 can also be a software platform for cloud computing.

Target system 108 can include consumer software that receives the package from data pipeline 106 and writes it to persistent storage 114. Target system 108 can transmit a commit notification 120 to LAS 104 when the package is committed to target system 108 (e.g., when the package is successfully written to persistent storage 114). Target system 108 (or data pipeline 106) can also transmit a rollback notification 122 to LAS 104 when a problem occurs between source system 102 and target system 108 (e.g., when the package fails to be committed in target system 108), and therefore LAS 104 needs to rollback and reconstruct the package.

Persistent storage 114 can represent any storage device that retains data after power to that device is shut off. Persistent storage 114 can be communicatively coupled to source 102. Persistent storage 114 can be the same as persistent storage 110 if source system 102 is the same device or platform as target system.

Data pipeline 106 can include one or more data processing steps 107 capable of being performed on the package received from LAS 104. The one or more data processing steps 107 can be performed on the package before the package is committed in target system 108. Data pipeline 106 can sequentially process the package through each data processing step 107. Data pipeline 106 can also concurrently process a different package at each data processing step 107. For example, at a given time, data processing step 107-1 can process a first package (e.g., a later package), and data processing step 107-2 can process a second package (e.g., an earlier package).

A data processing step 107 can perform any set of operations on a package. A data processing step 107 can also perform a filtering step on a package. This can potentially result in an empty package, and therefore result in no actual data being written to persistent storage 114. In this case, target system 108 can still transmit a commit notification 120 to LAS 104 to cause LAS 104 to update and or delete the package in persistent storage 112.

A data processing step 107 can be performed on source system 102, target system 108, or on an intermediary system between source system 102 and target system 108. A data processing step 107 can be performed on a desktop computer, server, virtual machine, container, laptop, tablet, smartphone, or another device as would be appreciated by a person of ordinary skill in the art. A data processing step 107 can also be performed on a software platform for cloud computing. A data processing step 107 can be communicatively coupled to a subsequent data processing step 107.

System 100 can utilize LAS 104 to solve several technological problems. First, system 100 can utilize LAS 104 to guarantee the ability to rollback and reconstruct a package if a problem occurs while processing the package through data pipeline 106. For example, system 100 can utilize LAS 104 to rollback and reconstruct a package that was not able to be committed to target system 108 because a problem occurred between somewhere between source system 102 and target system 108 (e.g., because there was a network problem or because target system 108 became temporarily unavailable). Second, system 100 can utilize LAS 104 to minimize the amount of time that other users are impeded from using persistent storages 110 and 114, For example, system 100 can utilize LAS 104 to reduce the amount of time that producer software on source system 102 locks a region of persistent storage 110. Finally, system 100 can utilize LAS 104 to increase the throughput of data pipeline 106.

LAS 104 can introduce a break in the package processing chain by providing access to persistent storage 121. Persistent storage 112 can be a small persistent storage close to source 102. Persistent storage 112 can represent any storage device that retains data after power to that device is shut off. Persistent storage 112 can be communicatively coupled to source 102. Persistent storage 112 can be the same as persistent storage 110 if source system 102 also implements LAS 104.

LAS 104 can be communicatively coupled to source system 102. LAS 104 can also be communicatively coupled to data pipeline 106. LAS 104 can receive a package from source system 102.

LAS 104 can include an input adapter (also referred to as LAS IN adapter) to receive a package from source system 102. The input adapter can be an application programming interface (API) to LAS 104. Producer software of source system 102 can utilize the input adapter to transmit a package to LAS 104, and therefore to write the package to persistent storage 112.

In some embodiments, "push" producer software on source system 102 can transmit the package to LAS 104 in a synchronous call. For example, the "push" producer software can call the input adapter of LAS 104 to transmit the package to LAS 104, and therefore write the package to persistent storage 112. The "push" producer software can wait until the call succeeds or fails (e.g., receives a response from LAS 104). If the call succeeds (e.g., LAS 104 wrote the package to persistent storage 112), the "push" producer software can commit the package that was read from persistent storage 110. In response to the committing, source system 102 can release any associated locks on persistent storage 110, thereby reducing the duration of locking of persistent storage 110. If the call fails (e.g., LAS 104 failed to write the package to persistent storage 112), the "push" producer software can retry calling LAS 104 to write the package to persistent storage 112. As would be appreciated by a person of ordinary skill in the art, "push" producer software can be software that runs in its own execution environment (e.g., outside LAS 104).

In some other embodiments, "pull" producer software on source system 102 can be invoked from in an external execution environment (e.g., in the same environment as LAS 104). For example, the input adapter of LAS 104 can poll the "pull" producer software on source system 102 for new data. In response, the "pull" producer software can transmit a package representing the new data to LAS 104, and therefore write the package to persistent storage 112. If the call succeeds (e.g., LAS 104 wrote the package to persistent storage 112), the "pull" producer can commit the package that was read from persistent storage 110. In response to the committing, source system 102 can release any associated locks on persistent storage 110, thereby reducing the duration of locking of persistent storage 110. If the call fails (e.g., LAS 104 failed to write the package to persistent storage 112), the "pull" producer can be re-invoked by the input adapter of LAS 104. As would be appreciated by a person of ordinary skill in the art, "pull" producer software can be software in which its invocation occurs in an external execution environment.

Upon receipt of a package at LAS 104, LAS 104 can write the package to persistent storage 112. If LAS 104 successfully writes the package to persistent storage 112, the package can then be treated as committed by source system 102 without risk of data loss. In other words, once LAS 104 writes the package to persistent storage 112, source system 102 can unlock the associated region of persistent storage 110 and read the next package to be transmitted to LAS 104. This can allow LAS 104 to begin processing another package through data pipeline 106 before the original package is completely processed through data pipeline 106. Thus, LAS 104 can asynchronously process packages in order through data pipeline 106.

LAS 104 can append the received package to an ordered list of packages on persistent storage 112. The ordered list of packages can store the packages currently being processed by data pipeline 106. The ordered list of packages can be ordered by the time of receipt of each package from source system 102. The ordered list of packages can be ordered in various other ways beyond time of receipt as would be appreciated by a person of ordinary skill in the art. LAS 104 can maintain the ordered list of packages using various data structures such as, but not limited to, a queue.

LAS 104 can store each package in the ordered list of packages with various pieces of metadata. LAS 104 can store a subscription identifier for each package. The subscription identifier can identify a group of logically related packages. LAS 104 can store a package identifier of each package. The package identifier can identify the logical position of the package among the other packages in the ordered list of packages for processing by data pipeline 106. LAS 104 can store the status of each package. The status can identify the processing state of the package in data pipeline 106. A package can have a status of "committed," "in-progress," "rolled back," or "new." A package can have various other statuses as would be appreciated by a person of ordinary skill in the art.

A status of "committed" can indicate the corresponding package was committed by target system 108 to persistent storage 114. A status of "in-progress" can indicate the corresponding package is currently being processed in data pipeline 106 and has not yet been committed by target 108 to persistent storage 114. A status of "rolled back" can indicate the corresponding package failed to be committed by target 108 to persistent storage 114 and therefore needs to be reconstructed. A status of "new" can indicate the corresponding package has not yet started being processed by data pipeline 106.

LAS 104 can receive a commit notification 120 indicating the package was committed by target system 108 to persistent storage 114. LAS 104 can receive the commit notification 120 via an output adapter of LAS 104 (also referred to as LAS OUT). The output adapter of LAS 104 can be an API.

LAS 104 can also receive a rollback notification 122 indicating a problem occurred between source system 102 and target system 108 (e.g., the package failed to be committed by target system 108 to persistent storage 114 and therefore needs to be reconstructed). LAS 104 can receive the rollback notification 122 via the output adapter of LAS 104.

LAS 104 can append received packages to the ordered list of packages until a high-water mark of data is reached. This can prevent the ordered list of packages from growing unbounded and can give the producer software on source system 102 an opportunity to do other work.

In some embodiments, LAS 104 can append received packages to the ordered list of packages until the ordered list of packages contains a threshold number of packages. For example, LAS 104 can append received packages to the ordered list of packages while the ordered list of packages is less than a threshold number of packages. In some other embodiments, LAS 104 can append received packages to the ordered list of packages until the ordered list of packages contains a fixed amount of data. For example, LAS 104 can append received packages to the ordered list of packages while the ordered list of packages contains less than a threshold level of data. In some other embodiments, LAS 104 can append received packages to the ordered list of packages until various other threshold values are reached.

In some embodiments, LAS 104 can append received packages to the ordered list of packages until a global high-water mark of data is reached. The global high-water mark of data can be a threshold level of data that is independent of whether the next received package is part of the same logical set of packages (e.g., shares the same subscription identifier).

In some other embodiments, LAS 104 can append received packages to the ordered list of packages until a subscription high-water mark of data is reached. The subscription high-water mark of data can be a threshold level of data that is subscription identifier specific.

Data pipeline 106 can sequentially process the packages stored in the ordered list of packages maintained by LAS 104. LAS 104 can transmit the next package marked as "new" in the ordered list of packages to data pipeline 106. LAS 104 can then set the package's status to "in-progress" in the ordered list of packages.

In response to receiving a commit notification 120 from target system 108, LAS 104 can mark the corresponding package's status as "committed" in the ordered list of packages. LAS 104 can also delete the corresponding package from persistent storage 112. In some embodiments, where a package is attempted to be committed to multiple target systems 108, LAS 104 can mark the corresponding package's status as "committed" in the ordered list of packages in response to receiving a commit notification 120 from each target system 108. LAS 104 can also then delete the corresponding package from persistent storage 112.

In response to receiving rollback notification 122 from target system 108 (or data pipeline 106), system 100 (e.g., via LAS 104) can automatically drop all packages subsequent to the rolled back package in data pipeline 106. This can prevent the creation of duplicates in persistent storage 114. This can further prevent inconsistencies due to order-dependency in the packages.

In response to receiving rollback notification 122 from target system 108 (or data pipeline 106), LAS 104 can also rollback and reconstruct all succeeding "in-progress" packages. In some embodiments, LAS 104 can identify the succeeding "in-progress" packages as those packages having a status of "in-progress" and a package identifier having a time of receipt (e.g., a larger package identifier) that is later than the package being rolled back. In some other embodiments, LAS 104 can identify the succeeding "in-progress" packages as those packages having a status of "in-progress," a package identifier having a time of receipt (e.g., a larger package identifier) that is later than the package being rolled back, and a subscription identifier that is the same as the subscription identifier of the package being rolled back.

LAS 104 can then generate new packages corresponding to all the succeeding "in-progress" packages. LAS 104 can change the status of each of the generated packages to "rolled back." LAS 104 can then sequentially transmit each of the generated packages to data pipeline 106. LAS 104 can change the status of each of the generated packages to "in-progress" after transmitting the respective generated package to data pipeline 106.

FIG. 2 is an example of an ordered list of packages 200 maintained by LAS 104, according to some embodiments. FIG. 2 is described with reference to FIG. 1.

Ordered list of packages 200 can include one or more packages received from source system 102. For example, ordered list of packages 200 can include package entries 210, 212, 214, 216, and 218. In ordered list of packages 200, each package can include a subscription identifier 202, a package identifier 204, a status 206, and data 208. As would be appreciated by a person of ordinary skill in the art, each package in ordered list of packages 200 can include various other types of fields.

Subscription identifier 202 can uniquely identify a subscription of packages. A subscription of packages can represent a group of logically related packages. For example, a subscription of packages can represent a set of packages associated with a particular user.

Package identifier 204 can uniquely identify a logical position of a package within a subscription that is to be processed by data pipeline 106 and committed to target system 108.

Status 206 can represent a processing status of a package. A status of "committed" can indicate the corresponding package was committed by target system 108 to persistent storage 114. A status of "in-progress" can indicate the corresponding package is currently being processed in data pipeline 106 and has not yet been committed by target system 108 to persistent storage 114. A status of "rolled back" can indicate the corresponding package failed to be committed by target 108 to persistent storage 114 and therefore needs to be reconstructed. A status of "new" can indicate the corresponding package has not yet been processed by data pipeline 106. As would be appreciated by a person of ordinary skill in the art, a package can have various other statuses.

Data 208 can represent the actual set of data changes making up a package. For example, data 208 can represent a series of structured query language (SQL) statements. Data 208 can also contain the actual contents of the package. Data 208 can also contain references to the content of the package. As would be appreciated by a person of ordinary skill in the art, data 208 can contain various other types of data.

Ordered list of packages 200 can include package entries 210, 212, 214, 216, and 218. Each package entry can represent a package that was processed, is being processed, or will be processed in data pipeline 106.

In FIG. 2, package entry 210 represents a package 0-0 of subscription 0 having data 0-0 that has been successfully committed to target system 108. After LAS 104 started processing package entry 210 through data pipeline 106, LAS 104 may have started processing package entries 212 and 214. However, during the processing of package entries 212 and 214, a failure may have occurred that required the rollback of package entries 212 and 214. In other words, LAS 104 may have received a rollback notification 122 from target system 108 (or data pipeline 106). LAS 104 may therefore have generated package entries 216 and 218 containing the same data sets as package entries 212 and 214, respectively. LAS 104 may mark package entries 216 and 218 as "rolled back" to indicate that these package entries represent rolled back packages.

System 100 can guarantee that no package can be committed to target system 108 unless all preceding packages have been committed. In other words, system 100 can guarantee that a rolled back package can only be succeeded by "in-progress" packages that can also be rolled back.

Because the producer software on source system 102 transmits packages to LAS 104 for writing to persistent storage 112, and because LAS 104 generates new packages for the rolled back packages from persistent storage 112, system 100 can travel back in time and reconstruct (also referred to as re-process) any number of uncommitted packages in case of a failure while minimizing locking duration. Producer software on source system 102 can also take several steps forward in time by committing packages and processing new ones while previous packages have not yet been fully (or at all) processed by data pipeline 106.

Figure 3:
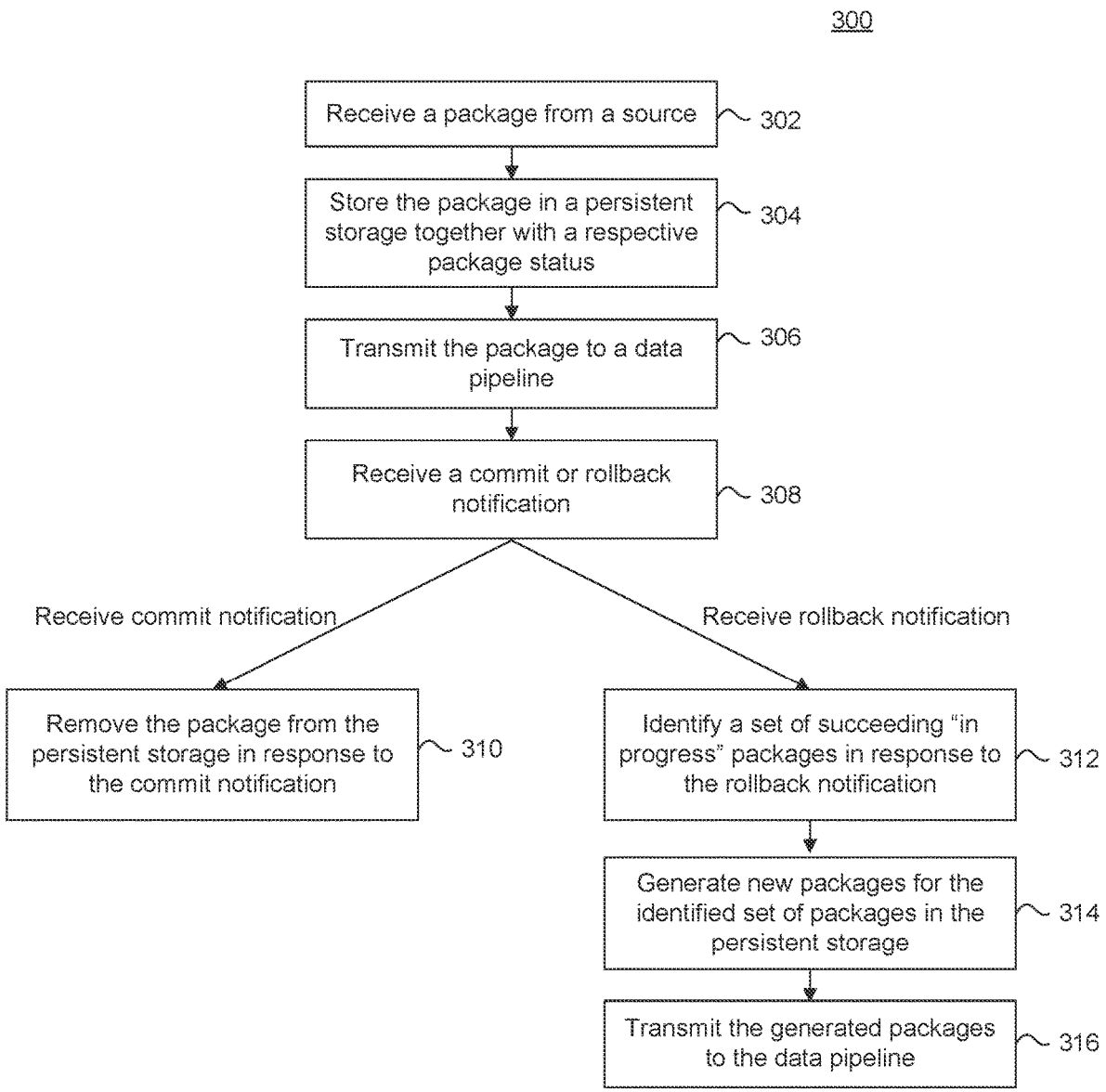
FIG. 3 is a flowchart illustrating a process for utilizing a LAS to guarantee reconstruction of a package while minimizing locking duration and enabling multiple packages to be processed in a data pipeline simultaneously, according to some embodiments.

FIG. 3 is a flowchart for a method 300 for utilizing a LAS to guarantee reconstruction of a package while minimizing locking duration and enabling multiple packages to be processed in a data pipeline simultaneously, according to an embodiment. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art.

Method 300 shall be described with reference to FIGS. 1 and 2. However, method 300 is not limited to that example embodiment.

In 302, LAS 104 receives a package from source system 102 that can be processed through data pipeline 106. The package can comprise a set of changes that are to be applied in full in target system 108, or not to be applied at all when a problem occurs between source system 102 and target system 108.

LAS 104 can receive the package from producer software on source system 102 via an input adapter of LAS 104 (also referred LAS IN). The input adapter can be an API. In some embodiments, LAS 104 can receive the package from the producer software in a synchronous call. In some other embodiments, the input adapter of LAS 104 can poll the producer software for new data. In response, the producer software can transmit a package representing the new data to LAS 104.

In 304, LAS 104 stores the package and its corresponding package status in persistent storage 112. LAS 104 can write the received package into an ordered list of packages (e.g., ordered list of packages 200) in persistent storage 112 that is being processed by data pipeline 106. For example, LAS 104 can append the received package into the ordered list of packages in persistent storage 112. LAS 104 can maintain the ordered list of packages using various data structures such as, but not limited to, a queue.

LAS 104 can store each package in the ordered list of packages together with various pieces of metadata. LAS 104 can store a subscription identifier for each package. The subscription identifier can identify a group of logically related packages. LAS 104 can store a package identifier of each package. The package identifier can identify the logical position of the package among the other packages in the ordered list of packages for processing by data pipeline 106. LAS 104 can store the status of each package. The status can identify the processing state of the package in data pipeline 106. A package can have a status of "committed," "in-progress," "rolled back," or "new." A package can have various other statuses as would be appreciated by a person of ordinary skill in the art In some embodiments, LAS 104 can append the received package to the ordered list of packages until a high-water mark of data is reached. In some embodiments, LAS 104 can append received packages to the ordered list of packages until the ordered list of packages contains a threshold number of packages. In some other embodiments, LAS 104 can append received packages to the ordered list of packages until the ordered list of packages contains a fixed amount of data. In some other embodiments, LAS 104 can append received packages to the ordered list of packages until various other threshold values are reached.

In some embodiments, LAS 104 can append received packages to the ordered list of packages until a global high-water mark of data is reached. The global high-water mark of data can be a threshold level of data that is independent of whether the next received package is part of the same logical set of packages (e.g., shares the same subscription identifier). In some other embodiments, LAS 104 can append received packages to the ordered list of packages until a subscription high-water mark of data is reached. The subscription high-water mark of data can be a threshold level of data that is subscription identifier specific.

In 306, LAS 104 transmits the package to data pipeline 106. LAS 104 can transmit the package to a data processing step 107 of data pipeline 106. The data processing step 107 can perform any set of operations on the package. The data processing step 107 can be performed on source system 102, target system 108, or on an intermediary system between source system 102 and target system 108. The data processing step 107 can be performed on a desktop computer, laptop, tablet, smartphone, or other device as would be appreciated by a person of ordinary skill in the art LAS 104 can update the status of the package in the ordered list of packages in persistent storage 112 in response to the transmitting. For example, LAS 104 can set the status of the package to "in-progress."

In 308, LAS 104 receives a commit notification 120 or a rollback notification 122. LAS 104 can receive the commit notification 120 or the rollback notification 122 via an output adapter of LAS 104 (also referred to as LAS OUT). The output adapter of LAS 104 can be an API. If LAS 104 receives a commit notification 120, method 300 proceeds to 310. If LAS 104 receives a commit notification 120, method 300 proceeds to 312.

In 310, LAS 104 removes the package from persistent storage 112 in response to receiving the commit notification 120. LAS 104 can mark the package as "committed" in the ordered list of packages in response to receiving the commit notification 120. LAS 104 can also delete the corresponding package from persistent storage 112.

In some embodiments, where the package is attempted to be committed to multiple target systems 108, LAS 104 can mark the corresponding package's status as "committed" in the ordered list of packages in response to receiving a commit notification 120 from each target system 108. LAS 104 can also then delete the corresponding package from persistent storage 112.

In 312, LAS 104 identifies all succeeding "in-progress" packages in persistent storage 112 response to receiving the rollback notification 122. In some embodiments, LAS 104 can identify the succeeding "in-progress" packages as those packages having a status of "in-progress" and a package identifier having a time of receipt (e.g., a larger package identifier) that is later than the package being rolled back. In some other embodiments, LAS 104 can identify the succeeding "in-progress" packages as those packages having a status of "in-progress," a package identifier having a time of receipt (e.g., a larger package identifier) that is later than the package being rolled back, and subscription identifier that is the same as the subscription identifier of the package being rolled back.

In some embodiments, system 100 (e.g., via LAS 104) can automatically drop all packages subsequent to the rolled back package in data pipeline 106. This can prevent the creation of duplicates in persistent storage 114. This can further prevent inconsistencies due to order-dependency in the packages.

In 314, LAS 104 generates new packages corresponding to all the succeeding "in-progress" packages. In some embodiments, LAS 104 can set the status of each of the generated packages to "rolled back."

In 316, LAS 104 transmits the generated packages in turn to data pipeline 106. LAS 104 can change the status of each of the generated packages to "in-progress" after transmitting the respective generated package to data pipeline 106.

Figure 4:
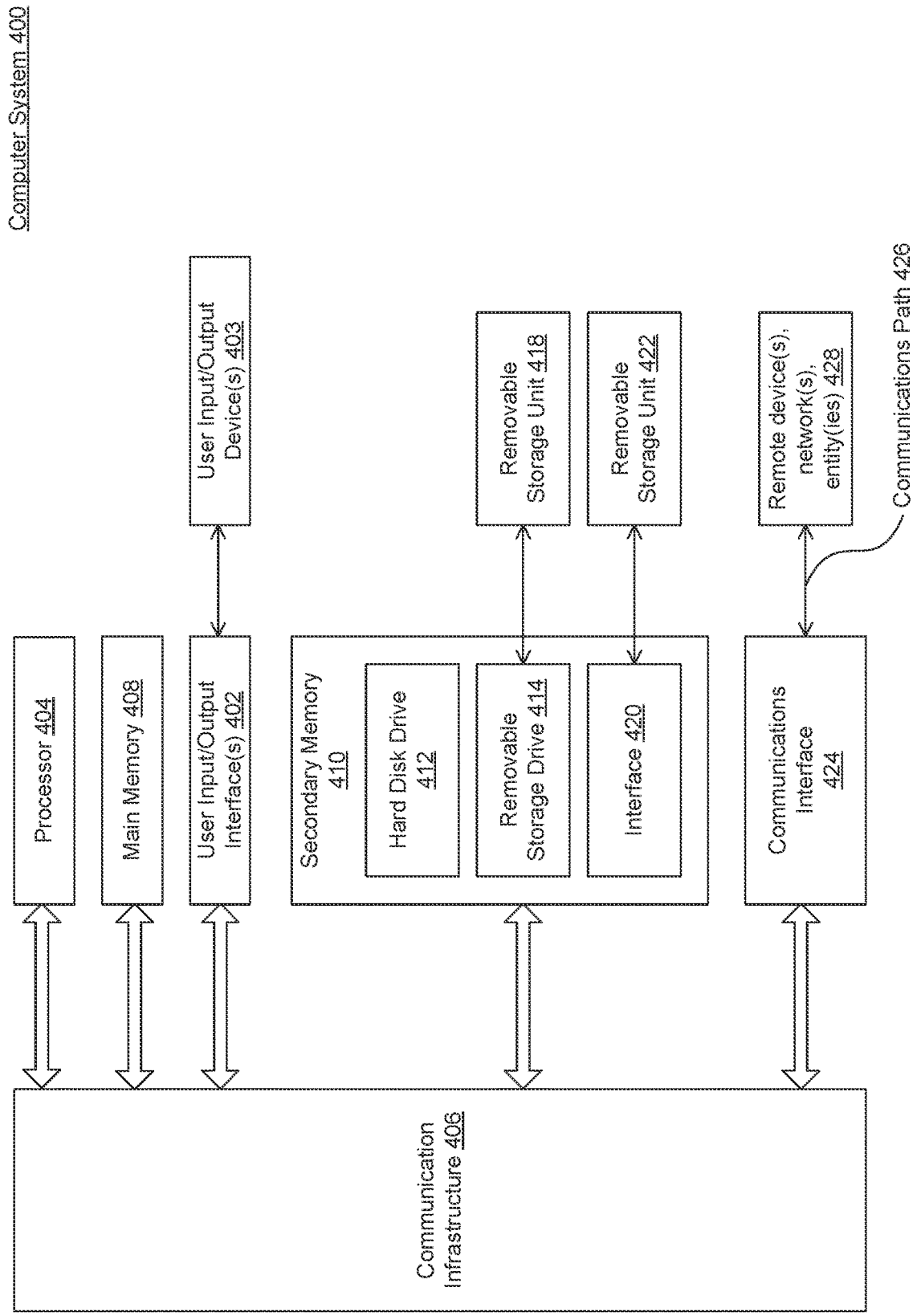
FIG. 4 is an example computer system useful for implementing various embodiments.

Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof. Computer system 400 can be used, for example, to implement method 300 of FIG. 3.

Computer system 400 may include one or more processors (also called central processing units, or CPUs), such as a processor 404. Processor 404 may be connected to a communication infrastructure or bus 406.

Computer system 400 may also include user input/output device(s) 403, such as monitors, keyboards, pointing devices, etc., which may communicate with communication infrastructure 406 through user input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method for enabling reconstruction of a package processed through a data pipeline, comprising:

receiving, by at least one processor, the package from a source system for processing through the data pipeline, wherein the package comprises a set of changes to be committed to a target system;

storing, by the at least one processor, the package in a persistent storage together with a respective package status;

transmitting, by the at least one processor, the package to the data pipeline in response to the storing;
receiving, by the at least one processor, a commit notification for the package from the target system in response to the transmitting; and
removing, by the at least one processor, the package from the persistent storage in response to receiving the commit notification for the package.

2. The method of claim 1, wherein the receiving further comprises:
receiving, by the at least one processor, the package via a synchronous call from producer software on the source system.

3. The method of claim 1, wherein the receiving further comprises:
receiving, by the at least one processor, the package via an application programming interface (API).

4. The method of claim 1, further comprising:
updating, by the at least one processor, the package status of the package in the persistent storage in response to the transmitting.

5. The method of claim 1, wherein the package is a first package, and further comprising:
receiving, by the at least one processor, a rollback notification for a second package;
identifying, by the at least one processor, a set of succeeding packages in the persistent storage associated with the second package, wherein each of the set of succeeding packages have a respective package status of in-progress;
generating, by the at least one processor, a set of packages in the persistent storage based on the identified set of succeeding packages; and
transmitting, by the at least one processor, each package in the generated set of packages to the data pipeline.

6. The method of claim 1, wherein the storing further comprises:
storing, by the at least one processor, the package in the persistent storage based on the persistent storage containing less than a threshold level of data.

7. The method of claim 6, wherein the threshold level of data is associated with a subscription identifier, and wherein the subscription identifier identifies a set of packages logically related to the package.

8. A system, comprising:
a memory; and
at least one processor coupled to the memory and configured to:
receive a package from a source system for processing through a data pipeline, wherein the package comprises a set of changes to be committed to a target system;
store the package in a persistent storage together with a respective package status;
transmit the package to the data pipeline in response to the storing;
receive a commit notification for the package from the target system in response to the transmitting; and
remove the package from the persistent storage in response to receiving the commit notification for the package.

9. The system of claim 8, wherein to receive, the at least one processor is further configured to:
receive the package via a synchronous call from producer software on the source system.

10. The system of claim 8, wherein to receive, the at least one processor is further configured to:
receive the package via an application programming interface (API).

11. The system of claim 8, wherein the at least one processor is further configured to:
update the package status of the package in the persistent storage in response to the transmitting.

12. The system of claim 8, wherein the package is a first package, and wherein the at least one processor is further configured to:
receive a rollback notification for a second package;
identify a set of succeeding packages in the persistent storage associated with the second package, wherein each of the set of succeeding packages have a respective package status of in-progress;
generate a set of packages in the persistent storage based on the identified set of succeeding packages; and
transmit each package in the generated set of packages to the data pipeline.

13. The system of claim 8, wherein to store, the at least one processor is further configured to:
store the package in the persistent storage based on the persistent storage containing less than a threshold level of data.

14. The system of claim 13, wherein the threshold level of data is associated with a subscription identifier, and wherein the subscription identifier identifies a set of packages logically related to the package.

15. A non-transitory computer-readable medium having instructions stored thereon that, when executed by at least one computing device, cause the at least one computing device to perform operations comprising:
receiving a package from a source system for processing through a data pipeline, wherein the package comprises a set of changes to be committed to a target system;
storing the package in a persistent storage together with a respective package status;
transmitting the package to the data pipeline in response to the storing;
receiving a commit notification for the package from the target system in response to the transmitting; and
removing the package from the persistent storage in response to receiving the commit notification for the package.

16. The non-transitory computer-readable medium of claim 15, wherein the receiving further comprises:
receiving the package via a synchronous call from producer software on the source system.

17. The non-transitory computer-readable medium of claim 15, wherein the receiving further comprises:
receiving the package via an application programming interface (API).

18. The non-transitory computer-readable medium of claim 15, wherein the operations further comprise:
updating the package status of the package in the persistent storage in response to the transmitting.

19. The non-transitory computer-readable medium of claim 15, wherein the package is a first package, and wherein the operations further comprise:
receiving a rollback notification for a second package;
identifying a set of succeeding packages in the persistent storage associated with the second package, wherein each of the set of succeeding packages have a respective package status of in-progress;
generating a set of packages in the persistent storage based on the identified set of succeeding packages; and
transmitting each package in the generated set of packages to the data pipeline.

20. The non-transitory computer-readable medium of claim 15, wherein the storing further comprises:
   storing the package in the persistent storage based on the persistent storage containing less than a threshold level of data.

\* \* \* \* \*